H. B. RICHARDS & R. SOLOMON.
AUTOMOBILE SIGNAL.
APPLICATION FILED MAR. 10, 1916.

1,193,821.

Patented Aug. 8, 1916.
2 SHEETS—SHEET 1.

Witnesses
Fenton S. Belt
J. W. Sherwood

Inventors
Harry B. Richards
Randolph Solomon
By A. L. Hough
Attorney

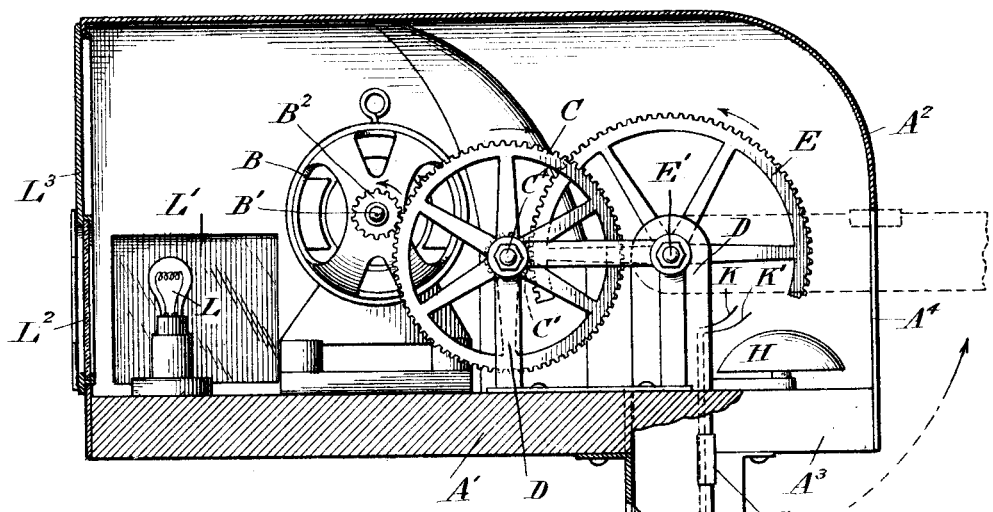
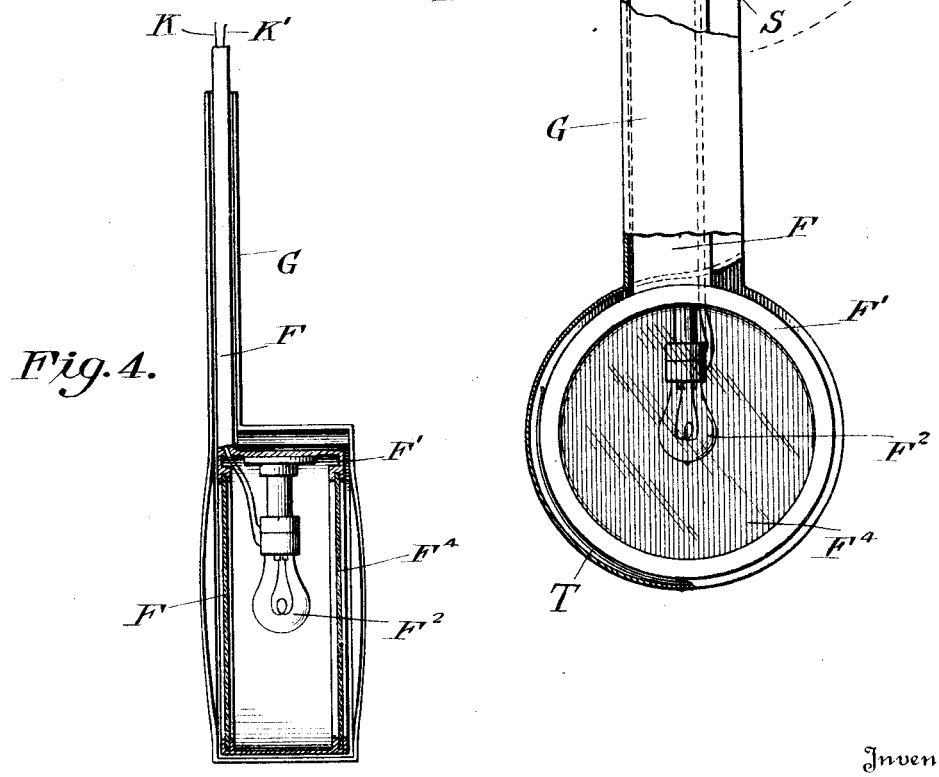

UNITED STATES PATENT OFFICE.

HARRY B. RICHARDS AND RANDOLPH SOLOMON, OF ALEXANDRIA, VIRGINIA.

AUTOMOBILE-SIGNAL.

1,193,821. Specification of Letters Patent. Patented Aug. 8, 1916.

Application filed March 10, 1916. Serial No. 83,370.

*To all whom it may concern:*

Be it known that we, HARRY B. RICHARDS and RANDOLPH SOLOMON, citizens of the United States, residing at Alexandria, in the county of Alexandria and State of Virginia, have invented certain new and useful Improvements in Automobile-Signals, of which the following is a specification, reference being had therein to the accompanying drawing.

This invention relates to new and useful improvements in automobile signals, and the object in view is to produce a device of this character whereby a visual signal may be displayed as a warning to other vehicles approaching from either direction, and actuated electrically through the medium of a push button operated by the driver of the automobile carrying the signaling apparatus.

Our invention comprises a simple and efficient device of this nature, and having various details of construction and combinations and adaptations of parts as will be hereinafter fully described and then specifically defined in the appended claims.

The present invention is clearly illustrated in the accompanying drawings, which with the letters of reference marked thereon, form a part of this application and in which drawings, similar letters of reference indicate like parts throughout the several views in which—

Figure 1:
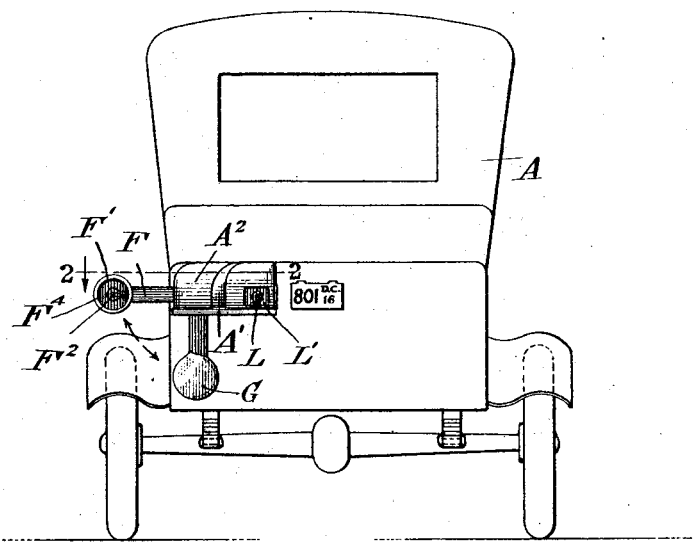
Figure 2:
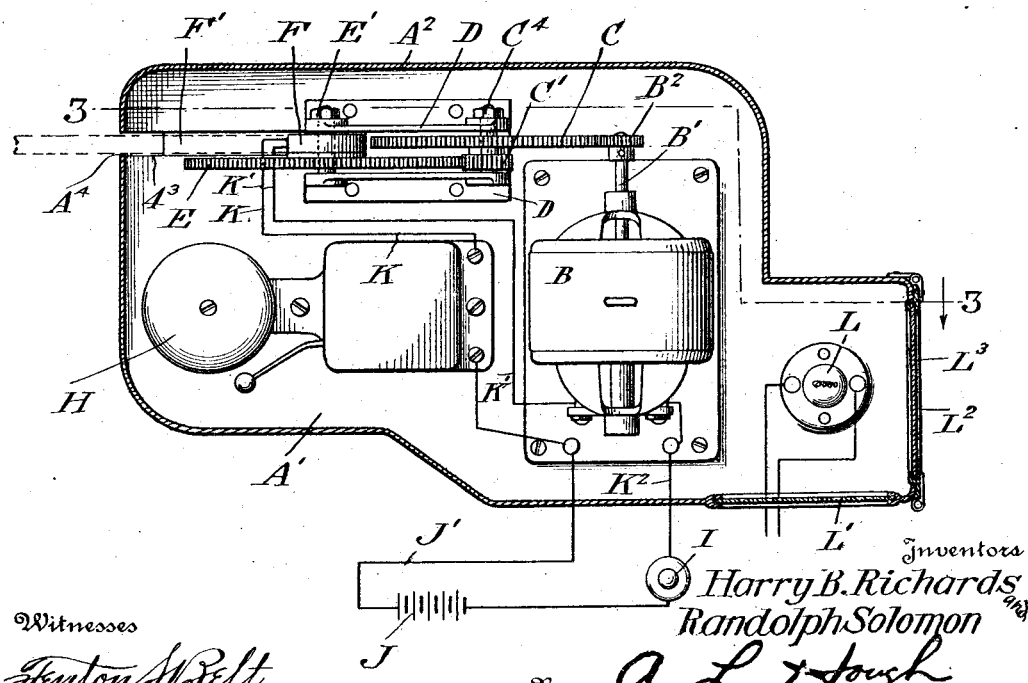

Figure 1 is a rear elevation of an automobile, showing the signaling apparatus applied thereto. Fig. 2 is a sectional view enlarged and taken on line 2, 2, of Fig. 1. Fig. 3 is a sectional view on line 3, 3, of Fig. 2, and Fig. 4 is a sectional detail of a portion of a semaphore, illustrated in Fig. 3.

Reference now being had to the details of the drawings by letter, A designates an automobile and A' is the base of a casing containing the signaling mechanism, and $A^2$ is a casing therefor which is fastened to said base. A suitable motor B is mounted upon said base and has a shaft B' to which a gear wheel $B^2$ is fixed and which is in mesh with a gear wheel C the latter being mounted on a shaft $C^4$ which is journaled in the brackets D secured to the base A'. A gear wheel C' is rigidly secured to the gear C and is in mesh with the segment gear E rotating on the shaft E', which latter is secured in the brackets D. Secured to and normally extending downward from said segment gear is a semaphore arm F having at its lower end a casing F' comprising a lamp containing chamber with electric lamp $F^2$ mounted therein. The front and rear faces of said casing are provided with signal glasses $F^4$, and the lamp is connected in the circuit, as illustrated in Fig. 2 by wires partially concealed in the arm F for protection. Extending downward from the under side of the base A' is a protecting housing G to receive the signal casing, when in an inoperative position. A suitable alarm bell H is secured to the base and is also in circuit as shown. A push button I is located within convenient reach of the operator. Suitable slots $A^3$ and $A^4$ formed in the housing allow the semaphore arm to swing freely, the swinging movement of the arm being limited in one direction by coming in contact with the end of the slot $A^4$, and held at right angles to the body of the automobile (the motor being stalled), until the push button I is released.

A lamp L is located on the base A' within the casing $A^2$, and is in circuit with the usual headlight lighting batteries, and shows a rear red light through the red glass L' in the rear of the cover, and illuminates a license number through the glass $L^2$ in the door $L^3$ at the rear inside end of the cover $A^2$.

It will be noted upon reference to Fig. 3 of the drawings that the inner concaved surface of the free end of the housing has a spring or buffer member T against which the wall of the chamber is adapted to contact when the arm swings down to normal position and that a buffer member S, which is fastened over the forward edge of the semaphore arm, is adapted to contact with the upper end of the slot $A^4$ when the arm is swung to a horizontal position, the buffer being provided to take up vibration incident to the arms coming to their limits in opposite directions.

In operation when the automobile equipped with the signaling apparatus is about to turn a corner, the operator by pushing upon the button, establishes a current from the battery J through the wires J' to bell H, thence by wire K to the semaphore lamp $F^2$, through wire K' to motor B, through motor and wire $K^2$ back to push button I, and through the medium of the intermeshing gear wheels, the semaphore arm will be swung to a signaling position to warn other parties in vehicles approaching from either direction.

Our invention may be applied to railway crossings or located in front of fire engine houses and other places where warning signals are required.

What we claim to be new is,—

1. An automobile signal apparatus comprising a casing adapted to be attached to the body of a car and having registering slots in the bottom and one end, a shaft journaled in the opposite walls of the casing, a segment gear fixed to the shaft, a semaphore arm rotating with the shaft and having a chambered end, the opposite walls of which are of transparent glass, a light interposed between the glasses, a housing fastened to the bottom of the casing, the rear wall of which is adapted to limit the movement of the arm in one direction, and electrical apparatus adapted to flash the light when thrown to a horizontal position over the fender at one side of the car.

2. An automobile signal apparatus comprising a casing adapted to be attached to the body of a car and having registering slots in the bottom and one end, a shaft journaled in the opposite walls of the casing, a segment gear fixed to the shaft, a semaphore arm rotating with the shaft and having a circular outlined chamber at its free end, the opposite walls of the chamber being provided with transparent glass, a lamp within the chamber, electrical means for flashing the lamp when thrown to a horizontal position to the side of the car, a housing terminating in a circular outlined portion for the reception of the chambered portion of the arm, a buffer secured to the inner wall of the circular outlined portion of the housing and against which the outer convexed wall of the chamber is adapted to contact when the semaphore is in its normal position, and a buffer upon the edge of said arm adapted to contact with the end of the slot in said casing as the arm is swung to a horizontal position.

3. An automobile signal apparatus comprising a casing for attachment to a car and having a bottom and adjacent end which are slotted, a housing secured to the bottom of the casing, open upon one side and the inner surface of the rear of the wall of the housing being flush with the end wall of the slot in the bottom of the casing, a shaft journaled in the walls of the housing, a semaphore arm fixed to said shaft and designed to be limited in its swinging movement in one direction by the wall of the housing and end wall of the slot, said semaphore having a chambered portion with signal glasses forming the opposite faces thereof and through which light is adapted to be reflected in opposite directions, and means for rotating said shaft.

In testimony whereof we hereunto affix our signatures in presence of two witnesses.

HARRY B. RICHARDS.
RANDOLPH SOLOMON.

Witnesses:
SAMUEL W. PRITTS,
J. M. DUNCAN.

Copies of this patent may be obtained for five cents each, by addressing the "Commissioner of Patents, Washington, D. C."